Aug. 10, 1926.

J. J. LIBI 1,595,341

BUTTER CUTTER

Filed Jan. 8, 1926     2 Sheets-Sheet 1

INVENTOR
JOHN J. LIBI.
ATTORNEY

Aug. 10, 1926.
J. J. LIBI
1,595,341
BUTTER CUTTER
Filed Jan. 8, 1926   2 Sheets-Sheet 2
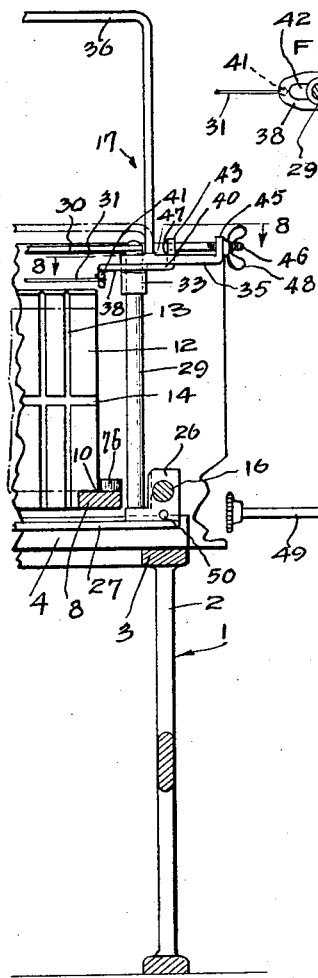
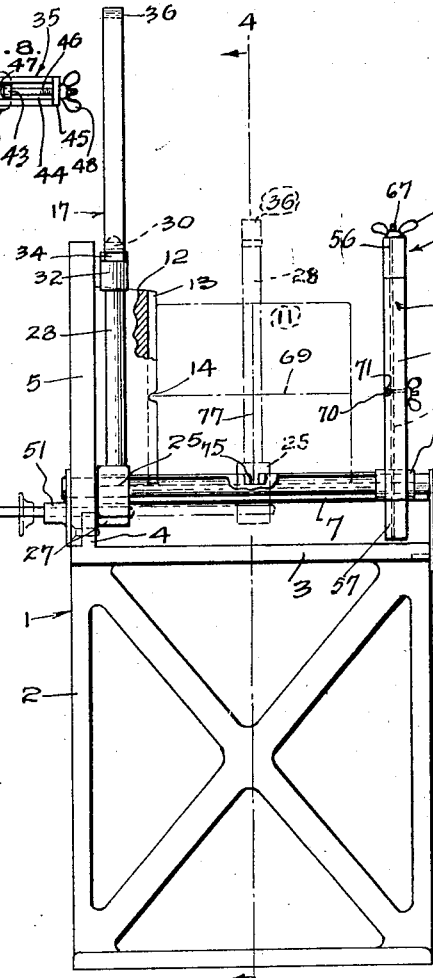
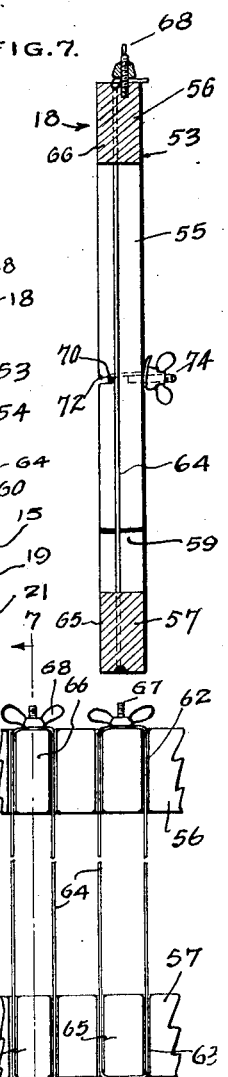
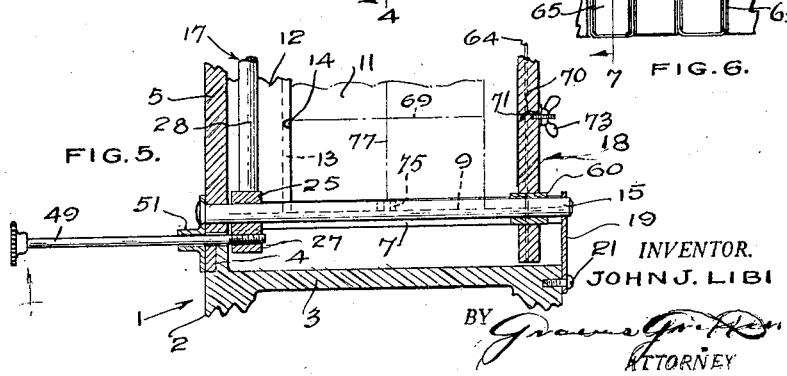
INVENTOR.
JOHN J. LIBI
BY
ATTORNEY Patented Aug. 10, 1926.

1,595,341

UNITED STATES PATENT OFFICE.

JOHN J. LIBI, OF SAN FRANCISCO, CALIFORNIA.

BUTTER CUTTER.

Application filed January 8, 1926. Serial No. 79,923.

This invention relates to butter cutters, and more particularly to those designed for cutting the ordinary "square" of butter into small, or "individual", squares for table use, and has for its principal object the provision of a small portable device of the character designated that may be used to advantage in institutions or like public places requiring large quantities of small cuts of butter for individual service.

Another object of the invention is the provision of a device of the character described that is of simple construction, cheap as to manufacture, durable, and that may be readily disassembled and assembled when required to be cleaned.

An additional object is the provision of a device of the character described that will cut a "square" of butter both longitudinally and transversely in two simple operations, thereby producing a quantity of small "squares" of equal size and uniform thickness.

A further object is the provision of a butter cutter of the class described that is provided with a cutting rack bearing a plurality of independently adjustable cutting wire-units, in which the several units may be independently replaced when broken or drawn taut when they have become slack or loosened.

Other objects and advantages will appear with reference to the accompanying two sheets of drawings, in which:

Figure 3 is a side elevation of the device, showing the longitudinal cutter and main cutting-rack in normal position, the dot-and-dash position representing the position to which the longitudinal cutter is moved when brought to position for use;

Figure 4 is a fragmentary vertical sectional detail, taken on the line 4—4 of Figures 1 and 3, showing one side of the longitudinal cutter, its adjusting means for tightening the cutting wire and its mounting relative to the supporting frame;

Figure 5 is a vertical sectional detail, taken on the line 5—5 of Figure 2, showing the supporting rod which carries the longitudinal cutter and main cutting-rack, also the push-rod connections to the longitudinal cutter-frame;

Figure 6 is a fragmentary detail of the inner face of the main cutting-rack, showing the method of securing the several cutting-units in place thereon;

Figure 7 is a vertical sectional view of the main cutting-rack, the section being indicated by the line 7—7 of Figure 6; and Figure 8 is a horizontal sectional detail of the longitudinal cutting-wire's tightening means for tension adjustment, the section being indicated by the line 8—8 of Figure 4.

Figure 1:
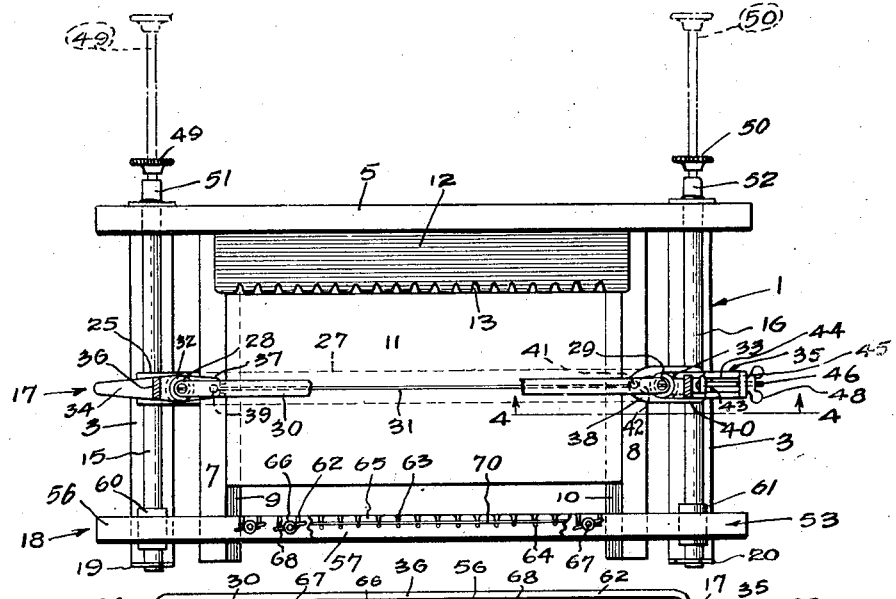
Figure 1 is a plan view, illustrating an embodiment of my invention, in which the longitudinal cutting mechanism is shown in position for use.

Referring with greater particularity to the drawings, my invention comprises a suitable supporting frame 1, having side frames 2 and horizontal members 3 provided with an upwardly extending member 4 rigidly connecting the side frames together, the whole being properly cast of light metal, such as aluminum, and adapted for the support of a rear upright member 5. The frame 1, as thus constructed, provides a means for the support of the working parts of the device, as well as a free open space between the side frames, front and rear, for the reception of a receptacle 6, in which to receive the butter as cut.

A pair of supporting members 7 and 8 bearing shoulders 9 and 10, extend horizontally from near the lower edge of the rear member 5, the shoulders being spaced apart sufficiently to receive and support a "square" of butter 11 in readiness for its subdivision into smaller parts, as represented in Figures 1, 2, 3 and 5.

A block 12, positioned against the inner face of the rear member 5 and extending between the shoulders 9 and 10 of the supports 7 and 8, provides a means for the rigid support of the butter bar, or "square," 11 against horizontal movement on the supports, the said block being provided with a plurality of equally spaced vertical grooves 13 and a horizontal groove 14, as hereinafter described. A pair of supporting rods 15 and 16 are rigidly secured to the rear member 5 and extend horizontally in parallelism with, and adjacent to, the supports 7 and 8 and provide a means for the sliding support of the longitudinal cutting-member frame 17 and the main cuttting-rack 18, the outer ends of said supporting rods being braced by means of a pair of pivotal supports 19 and 20 pivotally secured to the frame ends 3 by pins, or screws, 21 and 22, the upper ends being notched as indicated at 23 and 24, to receive the rod ends.

The longitudinal cutting-member 17 consists of a pair of bearing-blocks 25 and 26 having openings of sufficient diameter to allow of their smooth sliding fit upon the rods 15 and 16, the said blocks being rigidly braced at their lower ends by a connecting bar 27 and adapted for the support of uprights 28 and 29, which are connected together at their upper ends by a tie-bar 30, the frame, as thus formed, being slidable upon the rods 15 and 16 to a position midway of the butter "square" 11, Figures 1 and 3. The longitudinal cutting-wire 31 of the member 17 is carried by a pair of sleeves 32 and 33 adapted for vertical sliding movement upon the uprights 28 and 29, said sleeves being provided with integrally formed handle-grips 34 and 35 rigidly connected together by a connecting brace 36, the inner end 37 of the handle-grip 34 being provided with a downwardly extending lug 39, to which one of the extremities of the wire 31 is secured, the handle-grip 35 being provided with an adjustable plate 40 bearing an extension 38 carrying a lug 41, to which the opposite extremity of the wire 31 is secured.

The plate 40 is slotted, as indicated at 42, to accommodate the upright 29 and its outer end 43 is upturned and extends through a slot 44 formed in the plate or handle-grip 35, the outer end 45 of said plate being upturned and provided with an opening through which a swivel-bolt 46 extends, the inner end of said bolt being provided with a head 47 adapted to bear against the inner face of the upturned end 43 of the plate 40, and the outer end threaded and provided with a wing-nut 48 adapted to bear against the upturned end 45 of the handle, or plate, 35 to draw the wire 31 taut. Push-rods 49 and 50 are tapped into the blocks 25 and 26 and extend through guide-members 51 and 52 mounted upon the back of the rear member 5, as provisions for the manipulation of the cutting-member frame 17 to bring the cutting-wire 31 to cutting position centrally of the butter "square" 11.

The main cutting-rack 18 consists of a rectangular frame 53 constructed of either wood or metal and having side members 54 and 55 and top and bottom members 56 and 57, the lower inner edges of the side members 54 and 55 being notched, as indicated at 58 and 59, to allow of free movement of the rack relative to the supports 7 and 8, the rack being supported in a vertical position by sleeves 60 and 61 adapted for horizontal sliding movement upon the rods 15 and 16. The inner faces of the top and bottom members 56 and 57 of the rack are provided with a plurality of saw-kerfs 62 and 63 adapted for the reception of a plurality of vertically disposed cutting wire-units 64, each unit comprising a U-formed section of wire having its lower portion embracing the spacing member 65 of the member 57 and its upper free ends embracing the spacing member 66 of the member 56, the extremities thereof being adapted for bending over upon the upper edge of the member 56 and for clamping thereagainst, by means of a plurality of studs 67 and wing-nuts 68, the several sections of wire, properly spaced and held taut for cutting the butter "square" into the desired number of "individual squares".

The longitudinal horizontal cut 69, Figures 3 and 5, is accomplished by a longitudinally positioned wire 70, centrally spaced between the top and bottom members 56 and 57 of the rack, the said wire being housed near its extremities in slots 71 and 72 formed in the side pieces 54 and 55, with its extremities extending through holes in said side pieces to the front faces thereof and clamped tightly thereagainst by means of studs and wing-nuts 73 and 74.

The supports 7 and 8 are provided with bevelled slots 75 and 76 positioned intermediate the block 12 and their free ends, said slots being adapted to receive the lugs 39 and 41 of the longitudinal cutting-member 17, when said member is moved to cutting position, Figures 1 and 3, the brace 36, carrying the sleeves 32 and 33 and cutting-wire 31, being pressed downwardly to make the longitudinal cut 77 through the butter "square" 11.

Figure 2:
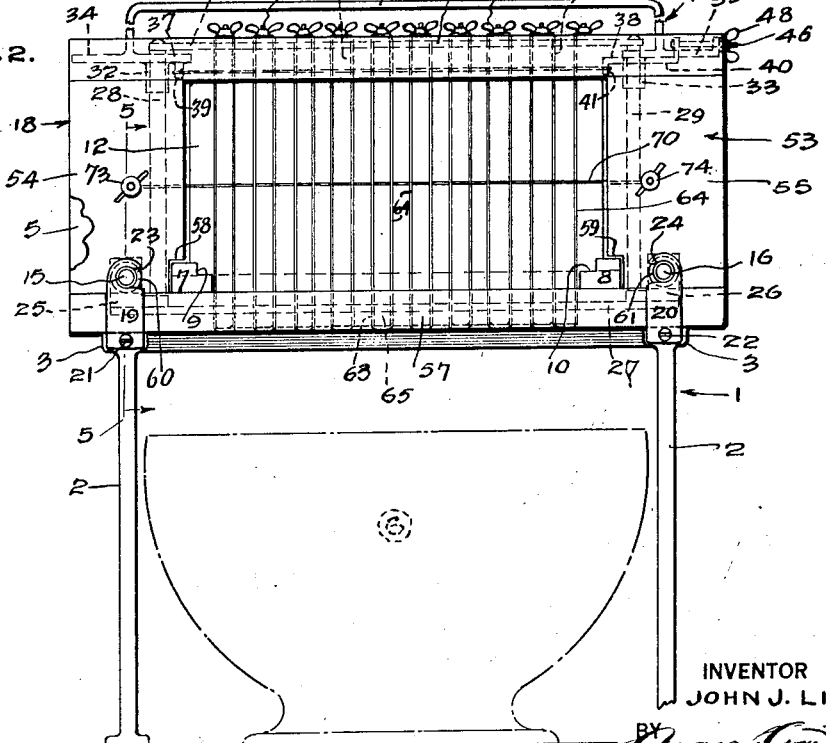
Figure 2 is a front elevation of the device, showing the main cutting-rack and method of its mounting for horizontal movement upon the supporting frame.

In the operation of the device, the longitudinal cutting member 17 is first moved to the full line position, Figure 1, by pressure upon the push-rods 49 and 50, and the brace 36 forced downwardly, thereby forcing the wire 31 through the butter "square" at the line 77. Upon the sleeves 32 and 33 having reached the limit of their movement, the wire 31 is withdrawn through upward pull upon the brace 36, the said sleeves being raised to the limit of their upward movement, as indicated in Figures 2, 3 and 4. The main cutting-rack 18 is now moved rearwardly upon the supports 15 and 16, thereby bringing the vertical wires 64 and longitudinal wire 70 into contact with and cutting the butter "square" 11 into a plurality of small "individual squares" of uniform dimensions, as hereinbefore described.

The main rack 18, carrying with it the longitudinal cutting-member 17, is forced rearwardly until the member 17 rests in its normal position against the back 5 of the device, Figures 3 and 5, at which position the wires 64 and wires 70 of said rack 18 are received by the grooves 13 and 14 of the block 12, thereby causing said wires to make a complete cut through the butter "square" and preventing adherence together of the "individual" cuts. After completion of cutting operation, the rack 18 is manually restored to normal position, as shown in Figures 1, 3 and 5.

Two, or more, main cutting-racks may be provided having their vertical cutting-wires variously spaced to provide for any desired thickness in the cut of the "individual squares", the main rack 18 being adapted for removal from the rods 15 and 16 by the release of the pivotal supports 19 and 20 from the rod ends and replacement by another rack, as and for the purpose stated.

I claim:

1. A device of the character described, comprising, in combination, a means for supporting a square of butter in position to be cut, a longitudinal cutting member adapted to be moved to a position for making a vertical cut therethrough longitudinally, and a cutting rack bearing a plurality of cutting-wires adapted to be brought into contact with said square and to be forced therethrough, thereby making a horizontal cut from end-to-end and a plurality of vertical cuts transversely therethrough.

2. In a device of the character described, the combination, a pair of cutting members, one of said members comprising a longitudinal cutting member bearing a taut wire adapted to cut vertically a positioned square of butter longitudinally and from end-to-end, the other of said cutting members being slidable relative to the first mentioned cutting member and comprising a horizontally arranged cutting wire and a plurality of vertically arranged cutting wires adapted, respectively, to make a horizontal cut through said positioned square of butter and a plurality of vertical cuts transversely therethrough.

3. A device of the character described, comprising a suitable supporting frame, a cutting block mounted in said frame, means for supporting a square of butter in position against said cutting block, a longitudinal cutting mechanism horizontally slidable relative to said square of butter and adapted for making a vertical cut from end-to-end thereof, a horizontally movable cutting rack mounted in said frame and consisting of a plurality of vertically arranged cutting wires and a horizontal cutting wire, and means for sliding said rack rearwardly into contact with the said square of butter to simultaneously cut said square both horizontally and vertically into a plurality of individual squares.

4. A device of the character described, comprising a suitable supporting frame, a cutting block mounted in said frame, supporting members mounted in said frame and adapted to support a square of butter in position against said block, a longitudinal cutting mechanism supported by said frame and horizontally slidable relative to said square of butter and adapted, when brought centrally of said square, for making a vertical cut therethrough and from end-to-end thereof, and a horizontally movable cutting rack mounted in said frame in opposition to said block and adapted, when moved rearwardly into contact with said square of butter, to make a horizontal cut and a plurality of vertical cuts therethrough, and adapted, upon its continued rearward movement, to return said longitudinal cutting mechanism to normal position.

5. A device of the character described, comprising a suitable supporting frame, a cutting block supported in said frame, means for supporting a square of butter in position against said block, a longitudinal cutting mechanism adapted to be moved to a position centrally of said square of butter and to make a vertical cut from end-to-end thereof, and a horizontally movable cutting rack adapted to be brought against the side of said square of butter to make a plurality of vertical cuts transversely therethrough and a single horizontal cut centrally therethrough.

In testimony whereof I have affixed my signature.

JOHN J. LIBI.